INVENTOR.
WILLIAM H. WANNAMAKER JR.

May 15, 1956 W. H. WANNAMAKER, JR 2,745,285
TEMPERATURE MEASURING APPARATUS
Filed Oct. 21, 1952 6 Sheets-Sheet 3

*INVENTOR.*
WILLIAM H. WANNAMAKER JR,
BY Arthur H. Swanson
ATTORNEY.

May 15, 1956 W. H. WANNAMAKER, JR 2,745,285
TEMPERATURE MEASURING APPARATUS
Filed Oct. 21, 1952 6 Sheets-Sheet 5
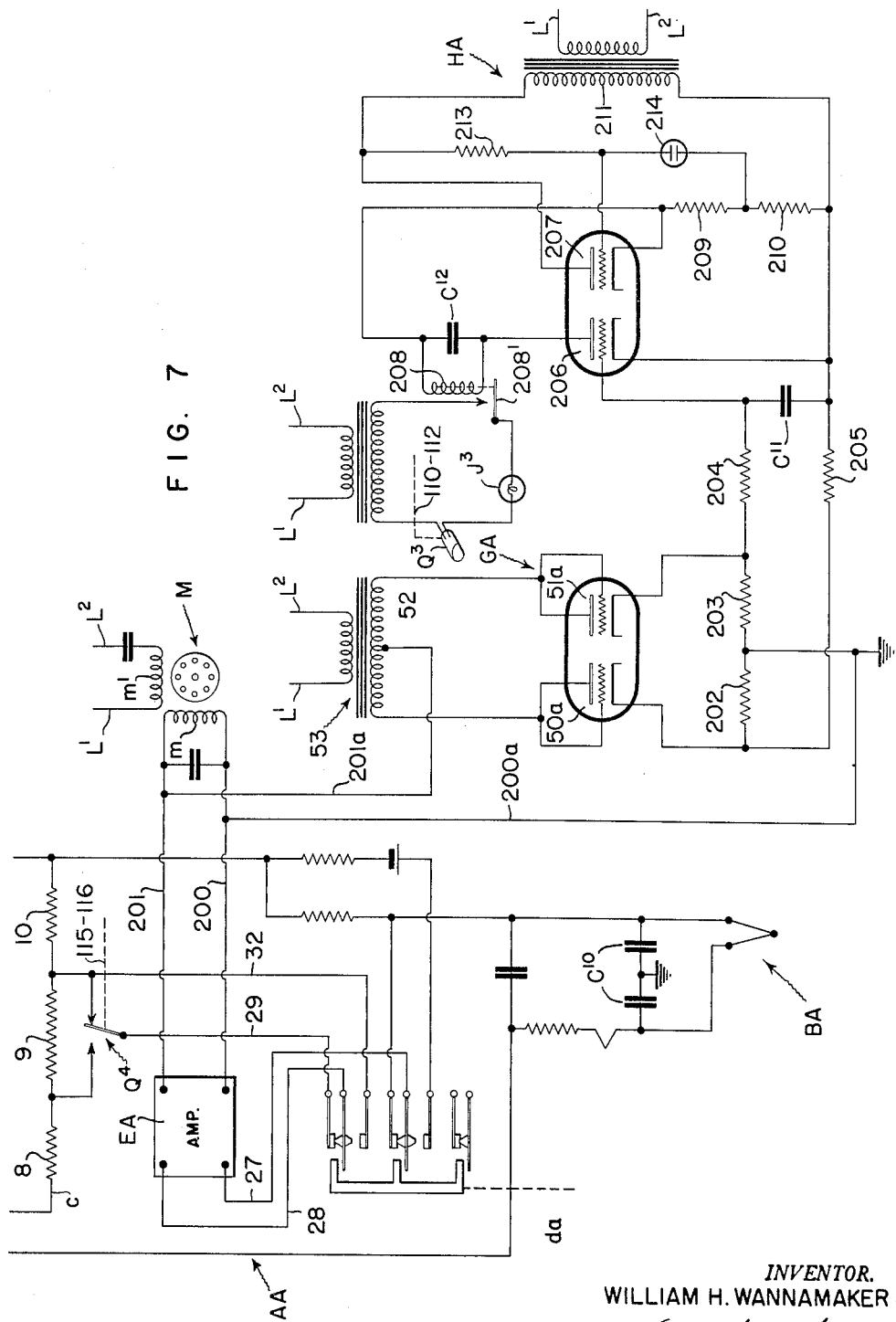
INVENTOR.
WILLIAM H. WANNAMAKER JR.
BY Arthur H. Swanson
ATTORNEY.

May 15, 1956 W. H. WANNAMAKER, JR 2,745,285
TEMPERATURE MEASURING APPARATUS
Filed Oct. 21, 1952 6 Sheets-Sheet 6

INVENTOR.
WILLIAM H. WANNAMAKER JR.
BY
ATTORNEY.

United States Patent Office 2,745,285
Patented May 15, 1956

2,745,285

TEMPERATURE MEASURING APPARATUS

William H. Wannamaker, Jr., Philadelphia, Pa., assignor to Minneapolis-Honeywell Regulator Company, Minneapolis, Minn., a corporation of Delaware Application October 21, 1952, Serial No. 315,975

5 Claims. (Cl. 73—360)

The general object of the present invention is to provide an improved method of and improved apparatus for utilizing thermocouples in measuring the temperature of molten metal, and particularly molten steel. Accurate measurements of the temperature of steel in its molten condition are essential to efficient production and treatment of steel. Such measurements present especial difficulties. In particular, it is to be noted that because of the relatively high speed with which the measurements must be made, and the high temperatures encountered, the thermocouples used must satisfy the contradictory requirements of relatively great ruggedness, and rapidity of response to changes in temperature.

To prolong the life of the thermocouple used in making such a measurement, the period during which a thermocouple is exposed to the molten metal temperature should be as short as is practically possible. Because of the importance of measurement speed, however, a suitable compromise between attainable conditions involving some sacrifice of thermocouple ruggedness is practically unavoidable and in practice the thermocouples are regarded as expendable elements. However, it is economically desirable to avoid any unnecessary decrease in the life expectancy of the thermocouple. To that end, the apparatus hereinafter described includes means for preheating the thermocouple before subjecting it to molten metal temperatures, and for initiating preparation of the apparatus for each measuring operation prior to the insertion of the thermocouple in its holder.

A primary object of the present invention is to provide a measuring apparatus including signalling or indicating means enabling the operator promptly and accurately to obtain information needed for properly carrying out various routine steps preparatory to each of the measurements made.

The routine steps ordinarily taken produce separate signals which indicate that: the thermocouple circuit is complete and operative; and that the instrument is standardized and ready to record; and indicate the instant at which a predetermined thermocouple preheat temperature is reached; and indicate the instant at which the thermocouple temperature becomes equal to the molten steel temperature.

Unless he learns promptly and definitely when the thermocouple attains the molten metal temperature, the operator must let the thermocouple soak for a time, and the resultant prolongation of the period during which the thermocouple is at a high temperature shortens the effective life of the thermocouple. Preferably also, in each measuring operation a prompt indication is given of thermocouple burn-out or other major inoperativeness.

A major object of the invention is to provide measuring apparatus for the purpose specified which is adapted to effect and record molten steel temperature measurements with suitable speed, by combining the standard type of self-balancing measuring apparatus of the well known type disclosed and claimed in the Wills Patent 2,423,540 of July 8, 1947, with special balance detecting and signalling or indicating apparatus so as thereby to form a novel and desirable molten metal temperature measuring unit.

The various features of novelty which characterize this invention are pointed out with particularity in the claims annexed to and forming a part of this specification. For a better understanding of the invention, however, its advantages, and specific objects attained with its use, reference should be had to the accompanying drawings and descriptive matter in which there is illustrated and described a preferred embodiment of the invention.

Of the drawings:

Fig. 7 is a circuit diagram illustrating a modification of the apparatus shown in Fig. 2.

Figure 1:
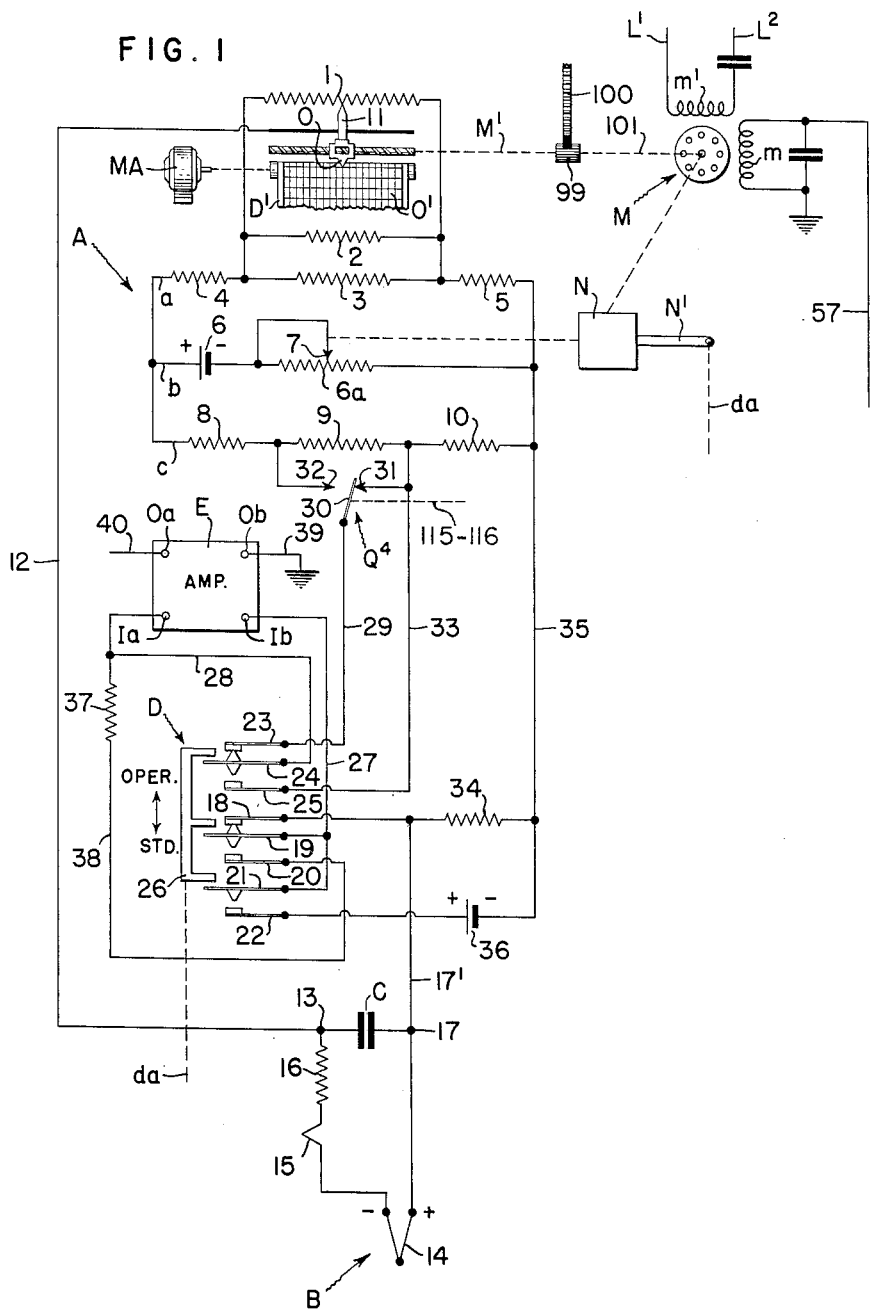
Fig. 1 is a circuit diagram of a self balancing measuring apparatus including automatic standardizing provisions.

The self balancing measuring apparatus shown diagrammatically in Fig. 1, is of the type and form disclosed in the above mentioned Wills patent, except in respect to certain standardizing and other adjusting features hereinafter described. The Fig. 1 apparatus comprises a bridge circuit A shown as having a slide wire branch $a$, an energizing branch $b$, and a calibrating branch $c$. The slide wire branch $a$ includes a slide wire resistor 1 connected in parallel with resistors 2 and 3 and in series with and between suppressor resistors 4 and 5. The circuit branch $a$ is connected in series with the energizing circuit branch $b$ which includes a battery 6 or other source of a small D. C. voltage, and a calibrating resistor 6a. The resistor 6a has an effective resistance which may be varied during each standardizing operation as required to provide the correct slidewire voltage. As diagrammatically shown, the effective resistance of the resistor 6a is varied in a well known manner by adjusting a wiper contact 7 along the resistor 6a and thereby short circuiting more or less of the latter. The circuit branch $c$ includes a resistor 8 having one terminal connected to the resistor 4 and the battery 6, a resistor 10 having one terminal connected to resistors 5 and 6a, and a resistor 9 connected between the resistors 8 and 10.

As is hereinafter explained, the wiper contact 7 and a wiper contact 11, engaging and adjustable along the length of the slide wire 1, are each automatically adjusted by a rebalancing motor M. The wiper contact 11 is connected by a conductor 12 to the negative output terminal 13 of a thermocouple unit B. The latter comprises a thermocouple hot junction 14 with its negative element connected to the terminal 13 and capacitor C through the thermocouple cold junction 15 and a resistor 16. The positive element of the thermocouple hot junction 14 is connected to the positive terminal 17 of the thermocouple unit and capacitor C. The thermocouple element B may be similar in structure and in its provisions for detachable connection to a thermocouple holder, to the thermocouple construction disclosed in the Tingle Patent 2,556,238 of June 12, 1951.

A conductor 17' connects the terminal 17 to a switch mechanism D, and through that mechanism and the input circuit of an amplifier E, the terminal 17 is connected to the calibrating branch c of the circuit A. The switch mechanism D comprises a group of contact elements 18, 19, 20, 21 and 22, and a second group of contact elements 23, 24 and 25. The switch mechanism D also includes a contact adjusting element 26 movable between an upper operating position shown in full lines, and a lower standardizing position. In its operating position, the switch element 26 does not operatively engage any of the contact elements 18 to 25, and the contacts 19 and 24 are then held in engagement with the contacts 18 and 23, respectively, as a result of the form and resiliency of those contacts.

The conductor 17' directly connects the terminal 17 to the contact 18. The input terminal Ia of the amplifier is connected by conductor 28 to the contact 24. The contact 19, engaged by the contact 18, is connected by a conductor 27 to the input terminal Ib of the amplifier E. As diagrammatically shown, the contact 23 is connected by a conductor 29 to the movable contact 30 of a range switch $Q^4$. The switch member 30 is pivoted for movement between one position in which it engages a switch contact 31, and a second position in which it engages a switch contact 32. As shown, the contact 31 is connected by a conductor 33 to the connected ends of the resistors 9 and 10. The switch contact 32 is shown as directly connected to the connected ends of the resistors 8 and 9. After the thermocouple is heated up to a predetermined temperature of 150° F. or so, the switch member 30 is automatically shifted from the position in which it engages the switch contact 31 to the position in which it engages the contact 32. That shift of the member 30 changes the range, or zero point of the measuring circuit and is effected by a switch cam mechanism P shown in Figs. 4 and 5 and hereinafter described.

When the switch member 26 is moved into its lower and standardizing position, it moves the contact 24 out of engagement with the contact 23 and into engagement with the contact 25; and moves the contact 19 out of engagement with the contact 18 and into engagement with the contact 20; and moves the contact 21 into engagement with the contact 22. The movement of the contact 19 out of engagement with the contact 18 interrupts the capacity of the measuring circuit to measure the thermocouple voltage, but leaves the terminal 17 connected to the connected ends of the resistors 10, 7 and 5 through a resistor 34 and a conductor 35. The resistor 34 has a high resistance, for example 1 megohm. The effect of the engagement of the contacts 21 and 22 is to connect the positive terminal of a standard cell 36 to the conductor 27 and thereby to the amplifier input terminal Ib. The negative terminal of the standard cell 36 is connected to the conductor 35. The downward movement of the switch member 26 moves the contact 24 out of engagement with the contact 23 and into engagement with the contact 25 which is connected by the conductor 33 to the connected ends of the resistors 9 and 10. With the contact 24 in engagement with the contact 25, the conductor 33 is connected to the conductor 28 and thereby to the second input terminal Ia of the amplifier. Thus when the switch member 26 is moved down into its standardizing position, the voltage of standard cell 36 and the voltage drop across resistor 10 are opposed in a circuit which includes the input circuit of the amplifier E.

The engagement of the contact 19 with the contact 20 resulting from the downward movement of the switch member 26 establishes a shunt including a resistor 37 across the input terminals Ia and Ib of the amplifier E. Said shunt thus forms a circuit branch connected in parallel with the amplifier input circuit branch in the block diagram E, and reduces the current through the last mentioned circuit branch during calibration. This is advantageous since the unbalanced signal voltages impressed on the input terminals Ia and Ib during calibration may be much larger than the unbalanced signal voltages impressed on said terminals during the measuring operation.

On a thermocouple burn-out in normal operation, the resistor 34 serves the safety purpose of effecting down scale movements of the wiper contact 11 into its zero position. The amplifier E has output terminals Oa and Ob shown as connected to a conductor 40 and to a grounded conductor 39, respectively. The conductors 39 and 40 transmit a control signal to the input circuit of a power amplifier F shown in Fig. 2.

The power amplifier F is shown as comprising two grid controlled valves 50 and 51, having their anodes connected to the opposite ends of the secondary winding 52 of a transformer 53 having a primary winding 54. The winding 54 is connected between alternating current line conductors L' and $L^2$. The voltage between the pair of line conductors L' and $L^2$ just mentioned and mentioned hereinafter, may be of the order of 115 volts. The frequency of the current applied by said conductors may be 25, 50 or 60 cycles per second. The cathodes of the valves 50 and 51 are connected to ground by a common cathode resistor 55. The cathodes are also connected to ground by a slide wire resistor or voltage divider 56. The control grids of the valves 50 and 51 are connected to ground by a resistor 41, and are connected by a condenser C' to the conductor 40 and thereby to the output terminal Oa of the amplifier E of Fig. 1.

A conductor 57 is adapted to connect the mid-point of the winding 52 to one terminal of the control winding m of a reversible, two phase motor M shown in Fig. 1. The second terminal of the winding m is connected to ground. The motor M has a power winding m' with terminals for connection to alternating current supply line conductors L' and $L^2$, and is employed to adjust the wiper contact 11 as required to rebalance circuit A when the latter is unbalanced by a variation in the voltage of the associated thermocouple unit B. The motor M may be and is assumed to be similar in construction and mode of operation to the rebalancing motor disclosed in the above mentioned Wills patent. As diagrammatically shown in Fig. 1, the motor M is made operative through control mechanism N to adjust the wiper contact 7 of the circuit A during automatic recalibrating operations, as is hereinafter described.

In the form of the invention illustrated in Figs. 1 to 5, the range of required angular movement of the motor M is that giving full scale movement to a recording pen O over a record chart O', i. e. a movement of the pen O between the chart zero, or low temperature left edge, and the chart high temperature right edge. As diagrammatically shown in Fig. 1, the motor M rotates a pinion 99 and thereby rotates the actuating gear element 100 of the previously mentioned switch cam mechanism P shown in Figs. 4 and 5, and hereinafter described.

A wiper contact 58, engaging and adjustable along the slide wire resistor 56, is connected to the control grids of grid control valves 60 and 61 of a phase detecting element G. The anodes of the valves 60 and 61 are connected to the opposite ends of the secondary winding 62 of a transformer 63. The primary winding 64 of transformer 62 is connected between alternating current line conductors L' and $L^2$. The cathodes of the valves 60 and 61 are connected to ground through a biasing voltage circuit including a slide wire resistor 65, a slide wire resistor 66 and a winding 67 across which each of the resistors 65 and 66 is connected. The cathode of the valve 60 is connected to the resistor 65 through a wiper contact 65' which engages and is adjustable along the length of the slide wire resistor 65. The cathode of the valve 61 is directly connected to a wiper contact 66' engaging and adjustable along the length of the slide wire resistor 66. The winding 67 has its mid-point connected to ground and is the secondary winding of a transformer 68. The primary winding 68' of the transformer 68 is connected between alternating current line conductors L' and L². The mid-point of the secondary winding 62 is connected to ground through a resistor 69 of a high resistance, for example, a resistance of 1 megohm.

The phase detecting element G controls the operation of a relay unit H. The latter comprises two grid controlled valves 70 and 71, having their anodes connected to the opposite ends of the secondary winding 72 of a transformer 73. The primary winding 74 of the transformer 73 is connected between line conductors L' and L². The cathodes of the valves 70 and 71 are connected directly to ground. The mid-point of the winding 72 is connected to ground by a conductor 75. The connection between the anode of the valve 70 and the transformer winding 72 includes a relay winding 76, and the connection between the anode of the valve 71 and the secondary winding 72 includes a relay winding 77. A filter condenser C² is connected in shunt to the relay winding 76, and a filter condenser C³ is connected in shunt to the relay winding 77. The operative energization of the relay winding 76 actuates an armature 78 to open a switch 78', and the operative energization of the relay winding 77 actuates an armature 79 to open a switch 79'. As diagrammatically shown, the switches 78' and 79' are connected in series with a switch Q³ and a signal lamp J³ between line conductors L' and L². The switch Q³ is closed by the previously mentioned switch cam mechanism P, shown in Figs. 4 and 5, when the thermocouple element is preheated to a temperature of 2500° F. When thereafter each of the relay windings 76 and 77 ceases to be operatively energized, each of the switches 78' and 79' close, and the signal lamp J³ will then light up and thereby indicate the completion of the measuring operation.

The conditions under which the switches 78' and 79' open and close may be explained as follows. When the measuring circuit A is unbalanced, one or the other of the relays 76 and 77 is normally energized, so that one or the other of the switches 78' and 79' is then open. Assuming that the plate of the valve 61 is positive when the grids of the valves 60 and 61 are positive, the valve 61 conducts and produces negative pulses which are impressed on the grids of the valves 70 and 71. The amplitude of the negative pulses may be regulated by adjusting the wiper contact 58 along the resistor 56. The plate of the valve 71 is positive at the same time the associated control grid is negative. Thus relay 77 is de-energized, while the grids of the valves 70 and 71 have zero bias when the plate of the valve 70 is positive, and the relay 76 is then energized. However, each of the valves 60 and 61 is biased to cut off with zero signal input, and when the pen O comes to balance, both of the phase detector valves 60 and 61 conduct, because of positive pulses then received from the cathode resistor 56. The voltage drop across the resistor 69 then approximates its maximum value, both relays 76 and 77 are then de-energized, the switches 78' and 79' are both closed, and the lamp J³ then lights up.

Figure 3:
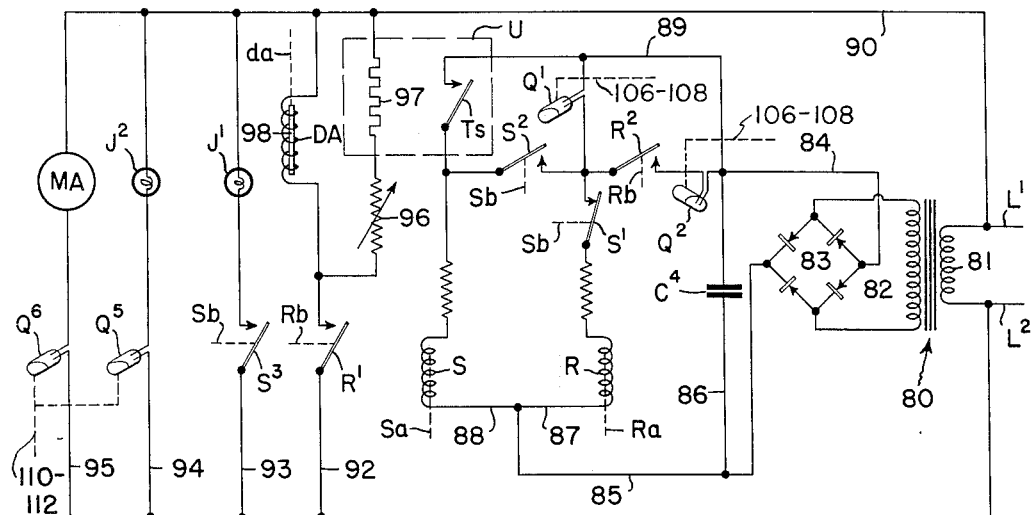
Fig. 3 is a circuit diagram illustrating the standardizing control and signal mechanism associated with the apparatus shown in Figs. 1 and 2.

The circuit network shown in Fig. 3, includes an energizing transformer 80 having a primary winding 81 and a secondary winding 82. The winding 81 is connected between alternating current line conductors L' and L². At this point it is noted that all of the pairs of line conductors L' and L² referred to herein, may be connected to a common source of alternating current. The terminals of the transformer secondary winding 82 are connected to the input terminals of a full wave current rectifier 83. The output terminals of the rectifier 83 are connected to conductors 84 and 85. The conductors 84 and 85 are connected by a circuit branch 86 including a condenser C⁴ and by a branch 87 including a relay winding R and a switch S' and a resistor, and by a circuit branch 88 including a relay winding S and a resistor. Switches R² and Q² are included in the portion of the conductor 84 extending between the circuit branches 86 and 87, and a switch S² is included in the portion of the conductor 84 connecting the branches 87 and 88. A conductor 89 is connected in shunt to the portion of the conductor 84 including switches S², R² and Q². A switch Q' is connected between the shunt conductor 89 and the junction of the switches S² and R².

A thermostatic switch Ts is included in the portion of the conductor 89 connecting the switch Q' to the circuit branch 88. The switch Ts and an associated heating resistor 97 collectively form a thermostatic delay relay device, or so called "Amperite" U. In its normal operation, the switch Ts closes and opens as its temperature is increased to and decreased from a predetermined temperature substantially higher than the ordinary atmospheric temperature. Said predetermined temperature is attained by the passage of a heating current of predetermined magnitude through resistor 97 having a predetermined delay heating up time or period.

The Fig. 3 network I also includes conductors 90 and 91, respectively connected to the same line conductors L' and L² connected to the winding 81. Separate branch conductors 92, 93, 94 and 95 are connected between the conductors 90 and 91. The branch 92 includes a switch R' having one terminal connected to the conductor 91 and having its other terminal connected to the conductor 90 through a variable resistance 96 and the previously mentioned heating resistor 97. The previously mentioned relay winding DA is connected in shunt to the portion of the circuit branch 92 which includes the resistors 96 and 97. The winding DA and an associated armature 98 collectively form a solenoid relay. The armature 98 is mechanically connected, as by means of rods da to the contact adjusting element 26 of the switch D, and to a controller arm N' of the mechanism N of Fig. 1. When the winding DA is operatively energized, the relay DA adjusts each of the elements 26 and N' from its upper position shown in Fig. 1 to a lower position thereby to adjust the measuring circuit A into its recalibrating condition, and to make the motor M operative to adjust the wiper contact 7 as required to effect the needed recalibration. The circuit branch 93 includes in series, a switch S³ and a signal lamp J'. The circuit branch 94 includes in series, a switch Q⁵ and a signal lamp J², and the circuit branch 95 includes in series, a switch Q⁶ and the chart motor MA.

The switches R' and R² shown in Fig. 3 are controlled by the relay R, by means of an armature Ra and switch actuators Rb, each of said switches being open when relay R is de-energized and being closed when relay R is energized. The switches S', S² and S³ of Fig. 3 are controlled by the relay S by means of an armature Sa and switch actuators Sb, the switches S² and S³ being open when relay S is de-energized and being closed when relay S is energized. The switch S', however, is closed when the relay is energized. The switches Q', Q², Q⁵ and Q⁶ of Fig. 3, the switch Q³ of Fig. 2, and the switch Q⁴ of Fig. 1, are all operated by the switch cam mechanism P shown in Figs. 4 and 5.

Figure 4:
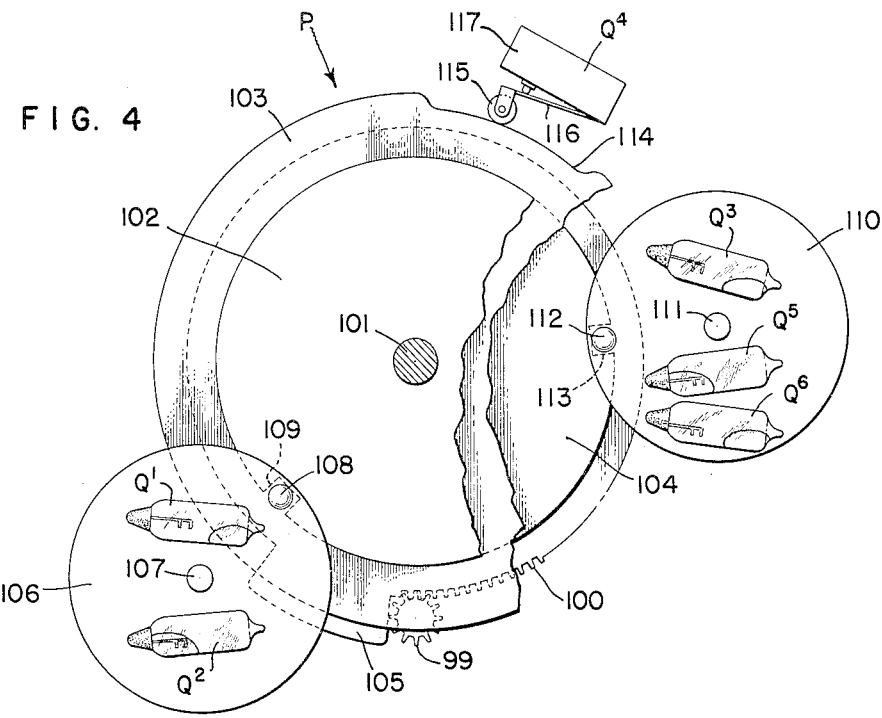
Fig. 4 is an elevation of a switch mechanism shown diagrammatically in Fig. 1.
Figure 5:
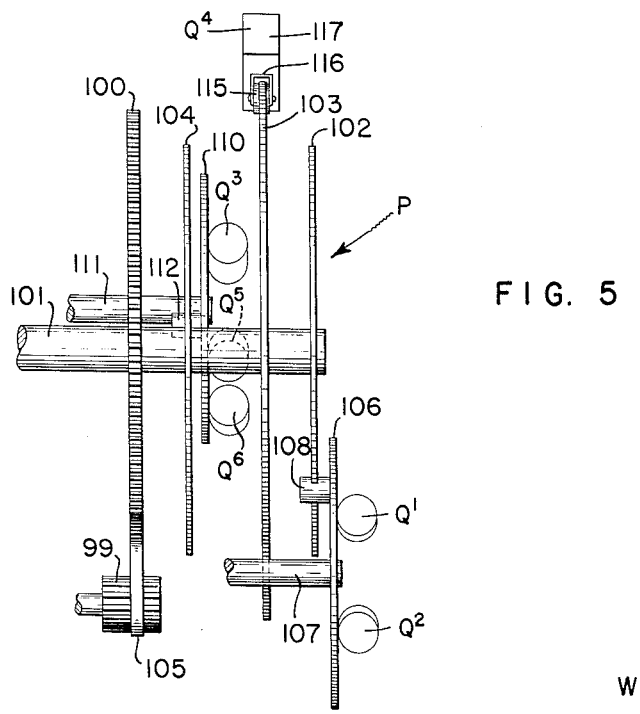
Fig. 5 is an elevation taken at right angles to Fig. 4, illustrating the relative arrangement of rotating switch mechanism elements.

As shown in Figs. 4 and 5, the switch element P comprises a spur gear 100 in mesh with the previously mentioned pinion 99 which is secured to a shaft 101 rotated by the motor M. The spur gear 100 is staked to three cams 102, 103 and 104, and has a stop projection 105. The latter is arranged to engage the pinion 99 or other stop member and arrest the rotative movement of the spur gear 100 and of the motor M at either end of an angular spur gear range of movement of something less than 360°.

In practice, the angular range of movement of the spur gear 100 and of each of the cams 102, 103 and 104, corresponds to the full scale movement of the pen O across the chart O'. Rotation of the cam 102 in the clockwise direction as seen in Fig. 4 from its initial or zero position through a movement range corresponding to the first five per cent or so of the full scale range, effects the closure of each of the switches Q' and $Q^2$.

As shown, the switches Q' and $Q^2$ are mercury switches mounted on a carrier 106 supported by a shaft 107 and rotatable about the axis of that shaft. The carrier 106 supports a transverse projection or pin 108 adjacent its periphery and is biased to move said projection into a recess or notch 109 formed in the peripheral edge of the cam 102, when permitted by the rotative position of said cam. In the initial position of the cam 102, the pin 108 at the right as seen in Fig. 4 of the plane including the axes of the shafts 101 and 107, and is in engagement with the portion of the peripheral edge of the cam 102 and adjacent the left or advancing edge of the notch 109. Thus only a slight clockwise rotative movement of the cam 102 is required to permit the projection 108 to enter the recess under a bias force which tends to maintain the carrier 106 in the position in which the axis of the pin 108 and the axes of the shafts 101 and 107 are in the same plane.

As the clockwise rotation of the cam 102 continues, the pin 108 moves farther into the recess until its axis intersects the plane which includes the axes of the shafts 101 and 107, and thereafter the pin is moved out of the recess 109 and into engagement with the portion of the peripheral edge of the cam 102 at the trailing side of the recess 109. The switches Q' and $Q^2$ are so disposed on the carrier 106 that the switch $Q^2$ closes very shortly after the pin 108 enters the recess 109, while the switch Q' does not close until the pin 108 is about to be cammed out of the recess 109.

After the switches Q' and $Q^2$ are closed as just described, they remain closed until the measuring operation is completed, unless and except as the switch $Q^2$ may be reopened during the standardizing operation under certain conditions hereinafter described.

The switches $Q^3$, $Q^5$ and $Q^6$ are mercury switches mounted on a carrier 110 supported by and rotatable about the axis of a shaft 111. The carrier 110 has a lateral projection or pin 112 which is moved into and then out of a recess 113 in the cam 104. The movement of the pin 112 into and out of the recess 113, is effected in the same manner as is the movement of the pin 108 into and out of the recess 109. The movement of the pin 112 into and then out of the recess 113 causes the switch $Q^5$ to close before the switch $Q^6$ is closed, and causes the switch $Q^3$ to close after the switch $Q^6$ closes. In practice, the parts may well be so arranged that the switch $Q^5$ closes during the portion of the thermocouple preheating operation in which the thermocouple B attains a temperature of 2,400° F., and that the switch $Q^6$ closes when the thermocouple attains a temperature of 2,450° F., and that the switch $Q^3$ closes when the thermocouple attains a temperature of 2,500° F.

The switch $Q^4$ is a precision snap switch which is operated by the switch cam 103 to move the range switch element 30 out of engagement with the contact 31 and into engagement with the contact 32 after the spur gear element 100 has moved through about ten per cent of its full scale range of movement, and the thermocouple has attained a temperature of about 150° F.

At the conclusion of the measuring operation, the gear 100 with the cams attached thereto, must be given a reverse or counter-clockwise rotation as seen in Fig. 4, which will return the gear 100 to its initial position in which the projection 105 engages the left side of the pinion 99. Such counter-clockwise rotation of the gear 100 returns the switches Q', $Q^2$, $Q^3$, $Q^4$, $Q^5$ and $Q^6$ to their respective positions shown in Fig. 4.

The regular operation of the apparatus shown in Figs. 1 to 6, as now contemplated, may be summarized as follows:

Each measuring operation is initiated with the hot junction portion 14 of the thermocouple element B out of the conventional thermocouple holder so that no temperature control signal can then be impressed on the input circuit of the amplifier E. However, if the thermocouple circuit is effective except for its non-inclusion of the thermocouple portion, current will then flow through the megohm resistor 34, just as it does in normal operation when the thermocouple burns out. That current flow causes the motor M to produce a down scale movement of the wiper contact 11 into its zero position, if not already in that position. When thereafter the thermocouple is connected in the circuit, the motor M moves the pen O up scale toward a position in which the thermocouple voltage corresponds to the ambient temperature to which it is subjected. Before the pen O attains that position, however, the relay R is energized and operates through armature Ra and switch actuators Rb to close the switches R' and $R^2$.

The closure of the switch R' energizes the relay DA and closes the energizing circuit to the heating resistor 97 of the thermostatic delay relay device U. The energization of the relay DA moves the switch element 26 of the switch mechanism D into its lower position as seen in Fig. 1, and thereby initiates a recalibrating or standardizing operation. That operation may adjust the contact 7 along the resistor 6a in the direction to increase, or in the direction to decrease the portion of the resistor 6a in series with the battery 6 circuit. When the adjustment decreases the effective resistance of the resistor 6a, it results in a down scale adjustment of both the contact 7 and the wiper contact 11 which reopens the switch Q' and de-energizes the relay R. This interrupts the standardizing operation, effects reconnection of the thermocouple B into the measuring circuit, and results in a recorder movement up scale toward the ambient temperature point producing a second closure of the switches Q' and R'. The alternate opening and closing adjustments of the switches Q' and R' are repeated until the standardization operation is completed. When the standardizing adjustment needed is a decrease in the effective resistance of the resistor 6a in series with the battery 6, the resultant adjustment of the wiper contact 7 and contact 11 are in the up scale direction and continue until the potential drop in the resistor 10 becomes equal to the voltage of the standard cell 36, and thus terminates the standardizing operation.

With the apparatus shown, the standardizing operation must be completed or terminated during the time period following the energization of the delay relay resistor 97 in which that resistor heats the thermostatic switch Ts to its closing temperature. That time period depends upon the design of the delay relay unit U, and should be a time period of a few seconds, which is somewhat greater than the time normally required for the completion of the standardizing operation. The closure of the switch Ts energizes the relay S. The energization of the relay S results in the closure of the previously open switches $S^2$ and $S^3$, and the opening of the previously closed switch S'. The relay S may control the switches S', $S^2$ and $S^3$ through armature Sa and switch actuators Sb. The parts Sa and Sb may be similar in structure and operation to the previously mentioned parts Ra and Rb. The opening of the switch S' de-energizes the relay R; the closure of the switch $S^2$ locks in the relay S; and the closure of the switch $S^3$ energizes the signal lamp J' and thereby signals the completion of the standardizing operation.

When thereafter the thermocouple attains a preheat temperature of approximately 150°, due to the operator placing the thermocouple in the vicinity of the molten metal, the roller 115 is moved out of the recess 114, and range switch element 30 of the range switch $Q^4$ is moved out of engagement with the contact 31 and into engagement with the contact 32. As the thermocouple temperature thereafter progressively increases to about 2,300° F., the spur gear 100 oscillates and alternately opens and closes the switch $Q^4$. This oscillating action is explained in the subsequent description of the chart shown in Fig. 6A. As the temperature of the thermocouple increases above 2,300° F., to a predetermined value which may well be 2,400° F., the angular movement of the cam 103 effects the closure of the switch $Q^5$. The closure of that switch energizes the signal lamp $J^2$ and thus indicates to the operator that the thermocouple temperature is high enough to permit the thermocouple to be brought into contact with the molten metal. The operator then effects such contact. On a further increase in the thermocouple temperature to a value which may well be 2,450° F., the switch $Q^6$ is closed and thereby effects the energization of the chart motor MA. A still further increase in the thermocouple temperature to 2,500° F., closes the switch $Q^3$.

The closure of the switch $Q^3$ puts the circuit including that switch in condition to light up the lamp $J^3$ as soon as the switches 78' and 79' are simultaneously closed. As has been previously explained, on the attainment of balance of the thermocouple and molten metal temperatures, both phase detector stage valves 60 and 61 become conductive with the result of simultaneously de-energizing the relays 76 and 77, whereupon the switches 78' and 79' are simultaneously closed. With those switches and the switch $Q^3$ closed, the lamp $J^3$ lights up and thus indicates to the operator that the measuring operation is completed. The thermocouple is then moved out of contact with the molten metal, and the apparatus shown in Figs. 1–5 is then returned to its initial condition in readiness to effect another molten metal temperature measurement.

Figure 6:
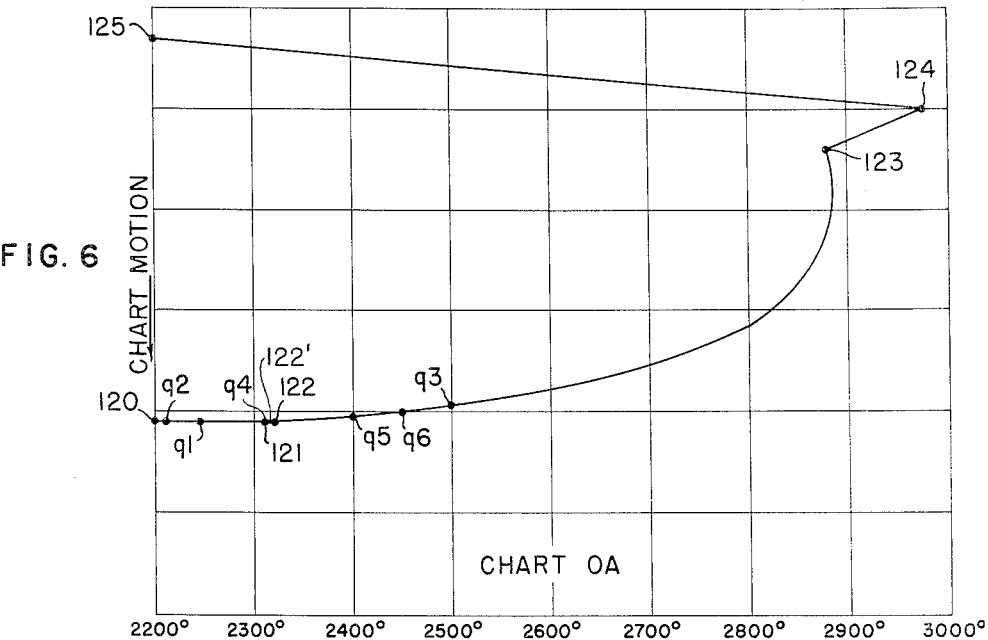
Fig. 6 is a chart illustrating thermocouple temperature measurements made with the apparatus shown in Figs. 1–5, as the thermocouple temperature varies in the course of a typical molten metal measurement.

The general manner in which the temperature of the hot junction portion 14 of the thermocouple element B varies during each measuring operation, is illustrated by the curve shown in the Fig. 6 chart OA. The curve portion which extends between the points 120 and 125 indicates the thermocouple temperatures recorded by the pen O on the chart O' as the wiper contact 11 moves from the left end of the slide wire resistor 1 of Fig. 1, to its right end and then returns to its left end. The chart OA of Fig. 6 may be a reproduction of a section of the strip chart O' shown in Fig. 1. The portion of the curve between the points 120 and 121 indicates the portion of the measuring operation effected with the element 30 of the range switch $Q^4$ in engagement with the contact 30. As previously explained, the switch $Q^4$ is actuated to shift the switch element 30 out of engagement with the contact 31, and into engagement with the contact 32, after a movement of the wiper contact 11 away from the down scale end of the slide wire resistor 1 for a distance corresponding to about 10% of the full range of movement of the wiper contact 11. The thermocouple temperature when the pen O reaches the point 121, is assumed to be about 150° F. With a temperature of 150° F., at the unsuppressed scale point 121, the temperature on the same scale at the chart zero point 120 is dependent on the design of the measuring circuit and in practice, may well be and is herein assumed to be −50° F. The scale of the temperatures measured by the curve portion between the points 122 and 124, may be assumed to be that indicated by the scale markings 2,200°–3,200°.

The temperature values indicated by the curve portion between the points 120 and 121 are measured in the unsuppressed scale condition of the apparatus in which the element 30 of the switch $Q^4$ is in engagement with the contact 31. The point 121 which indicates a thermocouple temperature of about 150° on the unsuppressed instrument scale, indicates a temperature of 2,300° F. on the suppressed scale of measurement becoming operative when the element 30 of the switch $Q^4$ is moved into engagement with the contact 32. Since the actual thermocouple temperature then is not 2,300° F., but is still about 150° F., the initial effect of the movement of the switch element 30 into engagement with the contact 32, is a counter-clockwise movement of the gear 100 of Fig. 4 which moves the element 30 out of engagement with the contact 32 and back into engagement with the contact 31. As the thermocouple temperature has not decreased, the switch $Q^4$ is immediately operated to move the element 30 back into engagement with the contact 32. The back and forth movements of the switch element 30 are repeated until the thermocouple attains a temperature of or slightly in excess of 2,300° F., which is indicated on the chart OA by the point 122. The thickened ink line 122' between the points 121 and 122 is the result of the oscillatory movements of the element 30 of the switch $Q^4$.

After attaining the suppressed scale value indicated by the point 122, the thermocouple temperature progressively increases at a rate which rapidly increases after the thermocouple is immersed in the molten metal and approaches the temperature of the latter. After the thermocouple temperature becomes equal to the molten metal temperature, the thermocouple is moved out of contact with the molten metal. The movement of the thermocouple out of contact with the molten metal results in an immediate increase in the thermocouple temperature which is indicated by the portion of the Fig. 6 curve between the points 123 and 124. That increase is due to the fact that the slag floating on, and the furnace atmosphere above, the molten metal are at temperatures higher than the molten metal temperature. Thereafter the thermocouple temperature is rapidly reduced to the ambient temperature.

The points along the curve portion between the points 122 and 123 indicated by $q^5$, $q^6$ and $q^3$, represent the thermocouple temperatures at which the switches $Q^5$, $Q^6$ and $Q^3$ respectively, close. The points $q^4$, $q^2$ and $q'$ on the curve portion between the points 120 and 121, indicate the respective temperature at which the switches $Q^4$, $Q^2$ and $Q'$ close.

As those skilled in the art will understand, the thermocouple B may be brought up to its maximum temperature in each measuring operation by either of two known immersion methods. In one of those methods, the thermocouple is initially immersed in the main mass of molten metal undergoing treatment to directly measure the temperature of the molten metal. In the other of those methods, commonly referred to as the "spoon technique," the thermocouple is immersed in a five pound sample of molten metal removed from the main mass of molten metal and held in a small ladle as the thermocouple heats up to the temperature of the sample. In the use of the "spoon technique," it is assumed that a definite relationship will exist between the temperature of the molten mass and the somewhat lower sample temperature when an established procedure is followed in removing and handling the sample and immersing the thremocouple therein. The use of the "spoon technique" permits of a significant reduction in the maximum temperature to which the thermocouple is subjected and this permits the use of less expensive thermocouple assemblies than are required with the first method.

Figure 8:
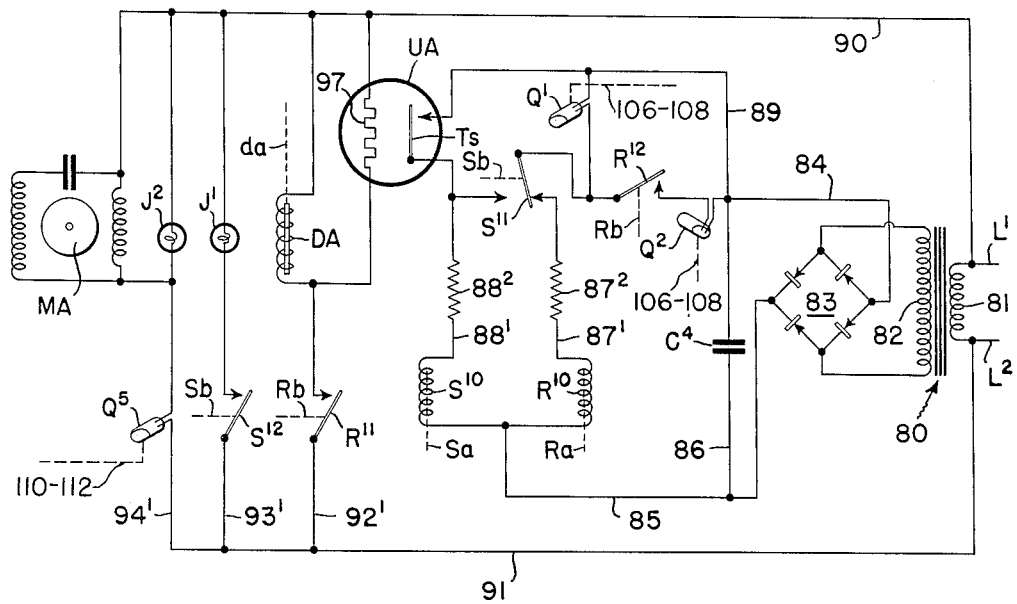
Fig. 8 is a circuit diagram illustrating a modification of the apparatus shown in Fig. 3.

The generic features of our invention illustrated by way of example in Figs. 1 to 5, may take various forms, and in Figs. 7 and 8 we have illustrated one practically desirable modification of the apparatus shown in Figs. 1 to 5. The apparatus illustrated in Fig. 7 includes a measuring section AA of which only a lower portion is shown. The section AA may be identical in structure and operation with the measuring section A, shown in Fig. 1, except that its amplifier unit EA includes a power amplifier unit similar in structure and operative purpose to the element F shown in Fig. 2. The output terminals 200 and 201 of the amplifier EA, which correspond to the amplifier output terminals 39 and 40, respectively, of Fig. 1, are directly connected through the control winding $m$ of the motor M. The thermocouple element BA of Fig. 7 differs in form from the thermocouple element B of Fig. 1, in that each hot junction terminal is connected to ground by a separate condenser $C^{10}$.

The phase detector unit GA and the relay unit HA of

Figure 2:
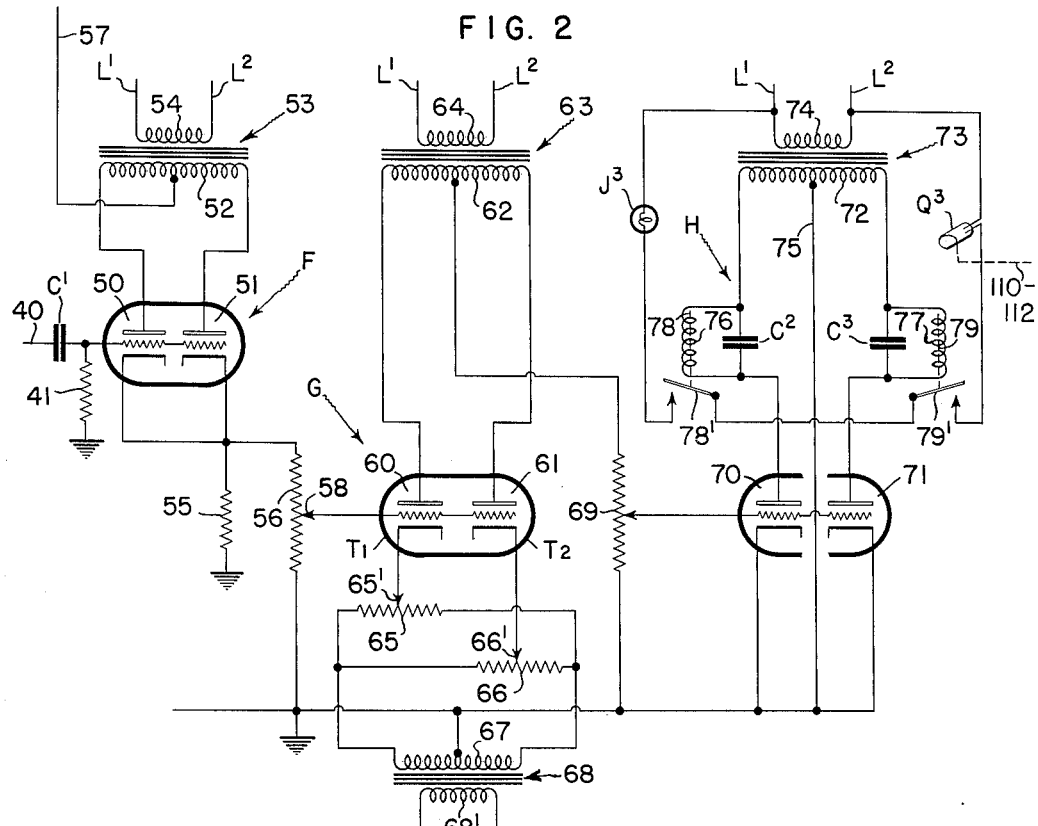
Fig. 2 is a circuit diagram illustrating motor drive and special detector mechanism.

Fig. 7 differ importantly from the elements G and H of Fig. 2. The unit GA includes electronic valves 50a and 51a which differ from the valves 50 and 51 of Fig. 2 in that they are triodes having their grids connected to their anodes so that they operate as diodes. The cathodes of the valves 50a and 51a are connected to ground through separate cathode resistors 202 and 203, respectively. The terminal of the control winding $m$ connected to the output terminal 201 of the amplifier EA, is also connected by a conductor 201a to the mid-point of the transformer secondary winding 52 of the transformer 53, and the terminal of the winding $m$ connected to the output conductor 200 of the amplifier EA, is connected by a conductor 200a to the grounded ends of the cathode resistors 202 and 203.

The element GA serves as a balance detector and as an indicator of the pen motion direction, and operates as a simple diode phase discriminator when fed the variable phase output signal of the amplifier EA. The output of such a discriminator is zero at the instrument balance point and is a large direct current signal when the instrument is not at the balance point. The polarity of the D. C. signal depends on and indicates the direction of pen motion when unbalance exists. The output section of the discriminator GA includes an R-C circuit comprising a resistor 204 connecting the cathodes of the valve 51a to one terminal of a condenser $C^{11}$, and a one megohm resistor 205 connecting the second terminal of the condenser $C^{11}$ to the cathode of the valve 50a. The R-C circuit integrates or filters the D. C. signal and is adapted to provide an adjustable time delay effect when such effect is desired. The valves 50a and 51a may well be of the known 12–AU–7 type and the nominal output voltage of the transformer 53 may well be 220 volts. The resistance of each of the resistors 202 and 203 may be 47,000 ohms and the resistance of each of the resistors 204 and 205 may be one megohm. The capacity of the condenser $C^{11}$ may be 0.5 mfd. The numerical values of the circuit components of the unit GA just stated are given by way of example of one set of such components suitable for practical use.

The relay unit HA of Fig. 7 is quite different in form and substance from the relay unit H of Fig. 2. It comprises triodes 206 and 207. The cathode of the valve 206 is connected to the cathode of the valve 50a through the resistor 205. The control grid of the valve 206 is connected by the resistor 204 to the cathode of the valve 51a. The control grid of the valve 206 is directly connected to the cathode of that valve by the condenser $C^{11}$. The anode of the valve 206 is connected to the cathode of the valve 207 by a relay winding 208 and a condenser $C^{12}$ in shunt to said winding. Resistors 209 and 210 are connected in series between the cathode of the valve 207 and the cathode of the valve 206. The cathode of the valve 207 is also connected through resistors 209 and 210 to one terminal of the secondary winding 211 of a transformer 212 having its primary winding connected between the conductors L' and $L^2$.

The second terminal of the winding 211 is connected to the anode of the valve 207. The control grid of the valve 207 is connected to the anode of the valve by a resistor 213, and is connected to the junction of resistors 209 and 210 by a glow tube 214.

The valves 206 and 207 may well be a 12–AU–7 type. The resistor 210 may have a rseistance of 100,000 ohms, and the resistor 209 may have a resistance of 39,000 ohms. The glow tube 214 may well be of the NE51 type, and the resistor 213 may have a resistance of 1 megohm. The voltage output of the secondary winding 211 may well be 550 volts. The glow tube 214 and resistor 213 connected in circuit with the anode and cathode of the valve 207, form a half-wave regulated power supply for the amplifier valve 206 which helps to compensate for A. C. line voltage variation effects. The relay 208 is de-energized when the measuring apparatus drives up scale and thereupon makes the grid of the amplifier valve 206 more negative and thus opens the relay controlled switch 208'. When said switch is thus opened, it stays open until the instrument attains balance and the charge has leaked off the condenser $C^{11}$.

When the measuring apparatus of Fig. 7 attains balance and closes the switch 208', it closes a circuit in which that switch is connected in series with a switch $Q^3$ and a signal lamp $J^3$ between alternating current supply conductors L' and $L^2$. The switch $Q^3$ and lamp $J^3$ of Fig. 8 may be respectively like the elements $Q^3$ and $J^3$ of Fig. 3. The lamp $J^3$ of Fig. 7 signals the completion of the measuring operation, just as does the lamp $J^3$ of Fig. 2. The switch $Q^3$ of Fig. 7 may be closed under the same conditions and by the same means provided to close the switch $Q^3$ of Fig. 2.

The circuit network shown in Fig. 8 is similar in general character and purpose to the circuit shown in Fig. 3 but it is somewhat simpler than the Fig. 3 circuit. The circuit network shown in Fig. 8 includes elements 80—86 corresponding substantially to the elements 80—86 of Fig. 3. The apparatus shown in Fig. 8 also includes elements 87', 88', 89, 90, 91, 92' and 93', corresponding generally to the elements 87 to 93, respectively, of Fig. 3. The Fig. 8 apparatus also includes a circuit branch 94' which serves purposes collectively served by the circuit elements 94 and 95, of Fig. 3.

In Fig. 8 the circuit branch 87' includes a resistor $87^2$ and a relay $R^{10}$. The latter may be a full equivalent for the relay R of Fig. 8 and operates when energized to close normally open switches $R^{11}$ and $R^{12}$. The switches $R^{11}$ and $R^{12}$ serve the general purposes of the switches R' and $R^2$ of Fig. 3. Similarly, the circuit branch 88' includes a resistor $88^2$ and a relay $S^{10}$ corresponding generally to the relay S of Fig. 3. The relay $S^{10}$ operates, when energized, to close two normally open switches $S^{11}$ and $S^{12}$, respectively. In Fig. 8 each of the resistors $87^2$ and $88^2$ may have a resistance of a thousand ohms. When the relay $R^{10}$ is energized, the relay $S^{10}$ is de-energized, and the switch $Q^2$ is closed, the conductor 85 is connected to the conductor 84 by the circuit branch 87', switch $S^{11}$, the switch $R^{12}$ and the switch $Q^2$. When the switch Q' is closed and the relay $S^{10}$ is energized and the relay $R^{10}$ is deenergized, the conductor 85 is connected to the conductor 84 through the circuit branch 88', switch $S^{11}$ and switch Q'.

The relay U of Fig. 3 is replaced in Fig. 8 by a thermostatic switch mechanism UA, shown as the conventional commercial Amperite 115 Mo. 5. As shown, the relay UA is different in form from the relay U, but in practice, the relay U may be of the form of the relay UA shown in Fig. 8. The switch S" of Fig. 8 is a 2 position switch which, when the relay $R^{10}$ is energized and the relay $S^{10}$ is deenergized, serves the purposes served by the relay R of Fig. 8 when the switch S' assisted with the last mentioned relay is closed.

An important operational difference between the circuit network shown in Fig. 8 and that shown in Fig. 3 results from the energization of both the chart motor MA and the signal lamp $J^2$ by the switch $Q^5$ in the circuit branch 94'. The switch $Q^5$ of Fig. 8 may be operated by the mechanism P of Figs. 4 and 5, which is arranged to effect an initial closure of the switch $Q^5$ as soon as the unsuppressed scale temperature of 150° F. is attained by the thermocouple element B. Since the suppressed scale temperature of 2,300° has not been attained, the initial closure of the switch $Q^5$ of Fig. 8 is followed by a reversal or counter-clockwise movement of the gear 100 of Fig. 4 which reopens the switch $Q^5$. Thereafter alternate movements of the gear 100 are repeated while the thermocouple temperature builds up as described in connection with Fig. 3, but with the difference that the oscillating movement of the gear 100 terminates when the thermocouple temperature rises to 2,300° instead of 2,400°.

The significant difference in respect to this oscillatory movement of the gear 100 between the Fig. 3 and the Fig.

8 arrangements is that each of the intermittent movements of the gear 100 in the clockwise direction results in a momentary energization of the chart motor MA in the Fig. 8 arrangement but not in the Fig. 3 arrangement. In consequence of the resultant inching along of the chart OB, the portion of the curve connecting the points 121 and 122 is a zigzag line transverse to the portion of the curve traced by the pen O when the chart motor is not energized. As shown by the chart OB of Fig. 6A, the zigzag line between the points 121 and 122 of Fig. 6A, facilitates the reading of the chart. Furthermore, the inching along of the chart OB avoids the movement of the pen O back and forth along the same line between the points 121 and 122, shown in Fig. 6, with the resultant application of too much ink to a small portion of the chart and a tendency of the pen to tear the chart paper.

As the temperature measured by the apparatus shown in Figs. 7 and 8 increases from about 150° F. to 2,300° F., the signal lamp J² lights up each time the switch Q⁵ closes and is extinguished or dimmed each time the switch Q⁵ is reopened, and this produces a flashing signal. After the 2,300° F. temperature is attained, the lamp J² is continuously illuminated until the measuring operation is completed, and the thermocouple temperature thereafter decreases to 2,300° F.

Figure 6A:
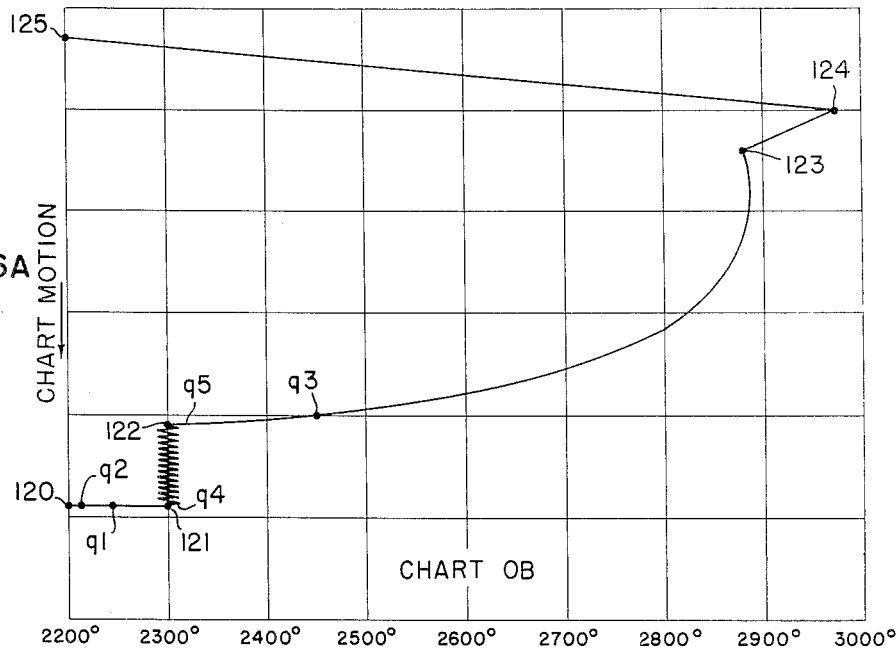
Fig. 6A is a similar chart illustrating thermocouple temperature measurements made with the modified apparatus shown in Figs. 7 and 8.

In the apparatus shown in Figs. 7 and 8, the signal lamp J³ is arranged to close when the temperature of the thermocouple attains a temperature of 2,450° F., and the thermocouple is then immersed in the molten metal, the temperature of which is to be measured. After that measurement is completed, the thermocouple is moved out of contact with the molten metal and its temperature rapidly varies as shown in Fig. 6A. While the signal elements J′, J² and J³ of each form of the invention disclosed herein are advantageously electric lamps, and may well emit light of different colors, other types of signal elements may be used. In particular, the lamps may be replaced by sound emitting elements which are readily distinguishable by the ear of the operator.

While, in accordance with the provisions of the statutes, I have illustrated and described the best form of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is as follows:

1. A molten metal temperature measuring apparatus comprising a self balancing potentiometric apparatus having a thermocouple adapted for immersion into a molten metal bath, said apparatus having an output on which a motor driving signal is present upon an unbalance of said apparatus, an electrical motor connected to be driven by said output and connected to rebalance said potentiometric apparatus, first switch means actuated by said motor as the motor adjusts said apparatus adjacent to a balance position indicative of equalization of the temperature of the thermocouple and the temperature of the molten metal, signal sensing means connected to respond to the driving signal to said electrical motor, a second switch means connected to be actuated by said signal sensing means upon balance of said potentiometric apparatus, and a signalling means connected to be controlled by said first and second switch means when both are actuated.

2. In a molten metal bath temperature measuring apparatus, the combination comprising, a thermocouple adapted for immersion in the molten metal, a self balancing potentiometric apparatus comprising an electrical network having said thermocouple connected thereto, an amplifier connected to said network to amplify unbalance signals therein, and a reversible motor connected to be controlled by said amplifier and to drive said network into balance, first switch means positioned to be actuated by the operation of said motor as said motor adjusts said network into a range approaching the temperature of the molten metal, an electrical signal sensing means connected to the output of said amplifier, said sensing means having a first output signal when said amplifier is driving said motor and a second output signal when said amplifier is not driving said motor, a second switch means connected to said sensing means to be actuated to a preselected position upon the occurrence of said second output signal, and a signalling means connected to be actuated by the simultaneous actuation of said first and second switch means.

3. Apparatus as defined in claim 2 wherein said electrical signal sensing means comprises a pair of electrical amplifying devices, relay means connected in the output circuit of each of said devices and each having switch contacts associated therewith, the switch contacts of each of said relay means comprising said second switch means, and an input connection to said amplifying devices having a signal indicative of the presence or absence of an electrical driving signal on said electrical motor.

4. Apparatus as defined in claim 2 wherein said electrical signal sensing means comprises an electrical amplifying device, a relay means connected in the output of said device, said relay means being operable to actuate said second switch means, and an input control circuit for said electrical amplifying device comprising a phase sensitive rectifier connected to respond to the electrical driving signal to said motor.

5. In a molten metal temperature measuring apparatus, the combination comprising a multi-range, self balancing potentiometric apparatus having at least two non-adjacent temperature ranges of operation, a potentiometric balancing motor connected to said apparatus to balance said apparatus in response to an unbalance thereof, a thermocouple connected to said apparatus to provide an input signal thereto, said thermocouple being adapted for exposure to a molten metal bath, a range changing switch connected to be actuated by said balancing motor as the temperature of said thermocouple changes in magnitude from one range of values toward another, means responsive to said range changing switch to effect an unbalance in said network tending to cause said motor to be driven back and forth between said one range and the other until the signal from said thermocouple is sufficient to maintain the range changing switch in one of its positions.

References Cited in the file of this patent
UNITED STATES PATENTS

| | | |
|---|---|---|
| 2,003,681 | Doyle | June 4, 1935 |
| 2,154,065 | Davis et al. | Apr. 11, 1939 |
| 2,475,362 | Tinkham et al. | July 5, 1949 |
| 2,548,014 | Gealt | Apr. 10, 1951 |
| 2,693,559 | Quereau et al. | Nov. 2, 1954 |